Dec. 13, 1938.   M. MARASCO ET AL   2,139,689
ANTISTATIC PHOTOGRAPHIC FILM
Filed May 15, 1936

Fig. 1.

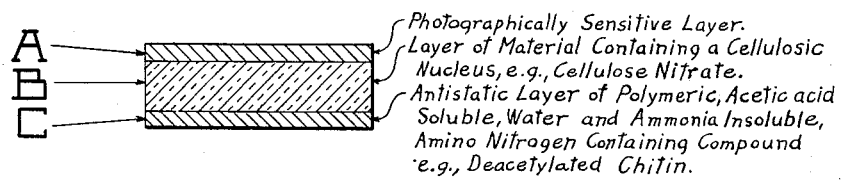

A — Photographically Sensitive Layer.
B — Layer of Material Containing a Cellulosic Nucleus, e.g., Cellulose Nitrate.
C — Antistatic Layer of Polymeric, Acetic acid Soluble, Water and Ammonia Insoluble, Amino Nitrogen Containing Compound e.g., Deacetylated Chitin.

Fig. 2.

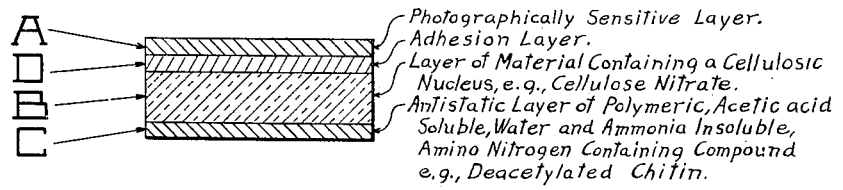

A — Photographically Sensitive Layer.
D — Adhesion Layer.
B — Layer of Material Containing a Cellulosic Nucleus, e.g., Cellulose Nitrate.
C — Antistatic Layer of Polymeric, Acetic acid Soluble, Water and Ammonia Insoluble, Amino Nitrogen Containing Compound e.g., Deacetylated Chitin.

Martin Marasco
Edmund B. Middleton
INVENTORS.

BY Paul J Culhane
ATTORNEY

Patented Dec. 13, 1938

2,139,689

UNITED STATES PATENT OFFICE 2,139,689

ANTISTATIC PHOTOGRAPHIC FILM

Martin Marasco, Parlin, and Edmund B. Middleton, New Brunswick, N. J., assignors to Du Pont Film Manufacturing Corporation, New York, N. Y., a corporation of Delaware Application May 15, 1936, Serial No. 80,016

13 Claims. (Cl. 95—9)

This invention relates to photography and more particularly to anti-static photographic films.

In the photographic art, particularly in cinematography, static electrical charges are frequently generated on the surface of films due to friction between the film and various contacting surfaces in cinematographic apparatus. Static charges may also be generated by friction in removing films from a package or from cassettes, holders and the like. These charges, if not counteracted, cause damaging markings in the photo-sensitive emulsion layer, and in extreme cases may cause fire.

The present invention has as an object to provide a static-free film. Another object is to provide a simple and effective means for preventing the generation of static charges on the surfaces of the film. A further object of this invention is to provide a means for preventing the harmful effect of static electrical charges on the photo-sensitive layers forming part or parts of these films.

It is well known that cellulose acetate films generally electrify positively and that cellulose nitrate films, which are used to an even greater extent than cellulose acetate films in the cinematographic art, generally electrify negatively. Gelatin electrifies with a charge opposite to that of films of cellulose nitrate. When foils or strips of cellulose nitrate films are coated with gelatin layers and the films wound up in rolls, gelatin layers are in contact with cellulose nitrate layers. Both of these layers are capable of being electrostatically charged; the gelatin positive and the cellulose nitrate negative. If another layer of a substance capable of being electrostatically charged positive be applied on the rear surface of the cellulose nitrate film already carrying one gelatin layer, then when the film is wound, positively-charged layers are in contact. Under conditions where surfaces of the same electrical sign are in contact, static disturbances are minimized.

It has already been proposed to neutralize or counteract these static charges by coating a layer of cellulose acetate on nitrate films carrying a photographic emulsion on the opposite surface. It has also been proposed to coat a layer of casein or gelatin on the rear surface of nitrate photographic films for the same purpose. When a film of this type is wound into a roll, the faces or surfaces in contact with each other, but capable of being separated, are electrically of the same sign, namely positive. But these anti-static backings have been expensive, difficult to apply, or lacking in adhesion and wearing qualities.

We have discovered that polymeric amino-nitrogen containing bodies characterized by being substantially insoluble in water and in 5% aqueous ammonia solution, soluble in chemically equivalent, i. e., stoichiometric amounts of 5%, and preferably 2%, aqueous acetic acid and preferably capable of being converted into a coherent film are further characterized by charging electrically positive and thus when applied to cellulose nitrate supports carrying a gelatin layer, counteract the tendency to form electro-static charges due to friction action and the like. We have also discovered that such anti-static layers are tough, water-resistant, insoluble in the usual photographic baths and resistant against scratching, chipping, abrasion or similar mechanical and physical damage.

An anti-static film embodying our invention may comprise a cellulose nitrate film (B of Figures 1 and 2 of the drawing) carrying a photosensitive gelatino silver halide layer (A of Figures 1 and 2 of the drawing) with or without an adhesion layer (D of Figure 2 of the drawing) on one side of the support and, on the other side, a layer of a polymeric amino-nitrogen containing body as above described, for example, de-acetylated chitin as prepared by the process of Rigby U. S. P. 2,040,879 (C of Figures 1 and 2 of the drawing).

Transparent films of a material containing a cellulose nucleus, for example, cellulose esters, cellulose ethers, regenerated cellulose, and more particularly cellulose nitrate, may form at least a part of the photographic film supports herein contemplated and the present invention is generic thereto. Because of the outstanding results obtained with cellulose nitrate film supports— these represent the preferred embodiment of our invention.

We have further found that the presence of certain acids is helpful in forming coating solutions and in increasing the degree to which the polymeric amino-nitrogen containing body prevents static disturbances. Acids which we have found useful in this sense are citric, acetic, lactic and in general the acids known as aliphatic organic acids. While inorganic acids can be used, the weaker organic aliphatic acids are preferred. We have further discovered that compounds forming electrolytes in aqueous-alcoholic, ethyl acetate or acetone solutions are also helpful in extending the degree to which these polymeric amino-nitrogen containing bodies counteract static disturbances in the film. Examples of such electrolytes are potassium, sodium and lithium chlorides and nitrates.

Having thus outlined the principles and objects of the invention, the following exemplifications thereof are given in illustration but not in limitation.

A stock solution of deacetylated chitin or piperidylmethylzein is prepared containing 3.1%, by weight, of the amino compound, 93.15% water and 3.75% of a soluble aliphatic acid, e. g., acetic acid, but preferably lactic acid. This stock solution is diluted with an alcohol-water solution, containing 50–75% alcohol and 30–50% water, until the concentration of the amino compound is between 0.01 and 0.06%.

If the wetting action of this soaking solution is not sufficient for the particular film base, other solvent-water ratios or other solvent mixtures may be used. For example, instead of the alcohol-water mixture, a solution comprising 55% alcohol, 15% ethyl acetate and 30% water, by weight may be used. This latter mixture is then used to dilute the amino-compound stock solution to the desired concentration. It is understood that solvent ratios, or solvent mixtures, may be varied from these cited examples for the purpose of obtaining good wetting of the film support by the anti-static solution without diverging from the scope of this invention.

This solution is applied to one side only of the film base, the film dried and then coated on the other side with a gelatino silver halide emulsion according to the methods and means well known in this art. It is also realized that methods of casting films and applying backing treatments are well known and need not be described here. It is, however, considered as part of this invention that the above-disclosed backing treatments may be applied to the film base at any stage in the manufacture of films.

The invention has been illustrated above in terms of deacetylated chitin such as that prepared by the process of Rigby U. S. P. 2,040,879. In addition to this material, acid soluble reaction products of proteins with carbonyl compounds such as lower aliphatic aldehydes and ketones and amines having less than nine carbon atoms in which the amino nitrogen is joined to the aliphatic carbon, for example, those disclosed in Meigs copending application, Serial No. 59,643, filed January 17, 1936, may be employed.

This application discloses the reaction of proteins such as gelatin, albumin, globin, zein, hordein, lagumin, edestin, gliadin, glycinin, and other albumins, globulins, glutelins, prolamines and certain conjugated proteins, for example, phosphoprotein, casein with amines such as dimethylamine, diethylamine, dipropylamine, dibutylamine, ethylmethylamine, methylpropylamine, butylethylamine, amylethylamine, butylpropylamine, pyrrolidine, piperidine, hexamethyleneimine, morpholine, piperazine, tetramethylpiperazine, ethylenediamine, diethylenetriamine, triethylanetetramine, glycamine, methylglucamine, ethanolamine, diethanolamine, methylamine, butylamine, isobutylamine, amylamines, benzylamine, xylylenediamines, beta-phynylethylamine and with carbonyl compounds such as for example, acetaldehyde, propionaldehyde isobutyraldehyde acroleinaldehyde chloral and methacrylaldehyde.

A desirable method of making the protein-amine carbonyl compound condensation product is to react the amines with the carbonyl compound to form, for example, methylol piperidine, and then react this to a mixture of a protein and a solvent, for example, methylol piperidine or mixtures of the same.

There may also be employed amino-celluloses soluble in dilute acetic acid containing an amino-nitrogen removed from the cellulose nucleus by a chain of atoms comprising at least one carbon atom, for example, those described in Hardy copending application, Serial No. 61,842, filed January 31, 1936; cellulose amines which are soluble in a stoichiometrical amount of 5% aqueous acetic acid containing directly attached to the cellulosic nucleus from 0.5 to 1.5 amino-nitrogens per glucose unit, these amino-nitrogens being attached to nucleus carbon atoms, for example, those in Haskins copending application Serial No. 61,806, filed January 31, 1936; reaction products of vinyl ketone polymers with amino compounds, for example, those described in Balthis copending application Serial No. 69,725, filed March 19, 1936; the products obtained by treating resins having ketone groups with an excess of ammonia or the equivalent thereof and hydrogenating the resulting mixture catalytically at superatmospheric pressure and temperature, such as those described in Greenewalt copending application, Serial No. 69,723, filed March 19, 1936; polymeric amino alcohol esters of acrylic and substituted acrylic acids, for example, those described in Harmon copending application Serial No. 21,810, filed May 16, 1935; and the polymeric alcohol methacrylates described in Graves copending application Serial No. 21,807, filed May 16, 1935, etc. single or in combination. These polymeric-nitrogen containing substances may be divided in several groups as follows:

(1) Those which may be termed cellulose derivatives. This includes, although not with strict accuracy, deacetylated chitin and the alkyl-amino and amino-alkyl celluloses above-identified.

(2) The second group consists in synthetic resins in the formation of which ammonia in some instances and monomeric-amino-nitrogen containing bodies have been employed. This group is distinct in that the highly polymeric molecules are built up wholly by artificial means. They are not synthesized by nature. In addition to the resinous polymeric amino alcohol esters of acrylic acid or of its homologs substituted in the alpha position by a hydrocarbon radical, there may be employed resinous reaction products of phenols, aldehydes and ammonia or primary or secondary amines, for example, the reaction product of meta-cresol, formaldehyde and dimethylamine.

(3) The third group consists of protein derivatives containing sufficient amino-nitrogen to enable them to meet the solubility requirements of the definition above given.

The process of the present invention results in a film of greatly decreased susceptibility to static effects not only in the film prior to printing but also in the exposed, printed, and completely processed film. The invention has its primary benefit, however, in the case of the film prior to development. In this case the prevention of static markings on the film is striking, and obviously of very considerable importance especially in the field of cinematographic film.

In the specification, the term "silver emulsion layer" is used to indicate the emulsion side of the film either before or after the process of exposure, development and printing. The term "light-sensitive gelatino silver halide emulsion layer" is used to refer to the layer before exposure.

The above description and examples are intended to be illustrative only. Any modification of or variation therefrom which conforms to the spirit of the invention is intended to be included within the scope of the claims.

We claim:

1. In combination, a transparent film support consisting principally of a material having a cellulose nucleus, a coating over said support of a polymeric amino-nitrogen containing organic compound soluble in an equivalent amount of 5% aqueous acetic acid, substantially insoluble in water and 5% aqueous ammonia and capable of forming a coherent film, and on the other side of said support a silver emulsion layer.

2. In combination, a transparent cellulose acetate film support, a coating over said support of a polymeric amino-nitrogen containing organic compound soluble in an aquivalent amount of 5% aqueous acetic acid, substantially insoluble in water and 5% aqueous ammonia and capable of forming a coherent film, and on the other side of said support a silver emulsion layer.

3. In combination, a transparent cellulose nitrate film support, a coating over said support of a polymeric amino-nitrogen containing organic compound soluble in an equivalent amount of 5% aqueous acetic acid, substantially insoluble in water and 5% aqueous ammonia and capable of forming a coherent film, and on the other side of said support a silver emulsion layer.

4. In combination, a transparent cellulose nitrate film support, a coating over said support of a polymeric amino-nitrogen containing organic compound soluble in an equivalent amount of 5% aqueous acetic acid, substantially insoluble in water and 5% aqueous ammonia and capable of forming a coherent film, and on the other side of said support light-sensitive gelatino silver halide emulsion.

5. In combination, a transparent cellulose nitrate film support, a coating of deacetylated chitin over said support and on the other side of said support a light-sensitive gelatino silver halide amulsion.

6. In combination, a transparent cellulose nitrate film support, a coating of piperidylmethylzein over said support and on the other side of said support a light-senstive gelatino silver halide emulsion.

7. In combination, a transparent cellulose nitrate film support, a coating of a light-sensitive gelatino silver halide emulsion over said support and on the other side of said support a coating of deacetylated chitin containing lactic acid.

8. In combination, a transparent film support consisting principally of a material having a cellulose nucleus, a coating of deacetylated chitin over said support and on the other side of said support a light-sensitive gelatino silver halide emulsion.

9. In combination, a transparent cellulose nitrate film support, a coating of a light-sensitive gelatino silver halide emulsion over said support and on the other side of said support a coating, containing lactic acid, of a polymeric amino-nitrogen containing organic compound soluble in an equivalent amount of 5% aqueous acetic acid, substantially insoluble in water and 5% aqueous ammonia and capable of forming a coherent film.

10. Process of preparing photographic film which comprises applying, to one side of a transparent film support consisting principally of a material having a cellulosic nucleus, deacetylated chitin in dilute aqueous-alcoholic, lactic acid solution and thereafter coating the other side of said film support with a gelatino silver halide emulsion.

11. Process of preparing photographic film which comprises applying, to one side of a transparent cellulose nitrate film support, deacetylated chitin in dilute aqueous-alcoholic lactic acid solution and thereafter coating the other side of said film support with a gelatino silver halide emulsion.

12. Process of preparing photographic film which comprises applying, to one side of a transparent cellulose nitrate film support, deacetylated chitin in dilute aqueous aliphatic acid solution and thereafter coating the other side of said film support with a gelatino silver halide emulsion.

13. Process of preparing photographic film which comprises applying, to one side of a transparent film support consisting principally of a material having a cellulosic nucleus, a solution in dilute aqueous aliphatic acid of a polymeric amino-nitrogen containing organic compound soluble in an equivalent amount of 5% aqueous acetic acid, substantially insoluble in water and 5% aqueous ammonia and capable of forming a coherent film, and thereafter coating the other side of said film support a gelatino silver halide emulsion.

MARTIN MARASCO.
EDMUND B. MIDDLETON.